(12) United States Patent
Zhang

(10) Patent No.: US 12,434,606 B2
(45) Date of Patent: Oct. 7, 2025

(54) SAFETY INDICATOR AND CHILD SAFETY SEAT HAVING THE SAME

(71) Applicant: BAMBINO PREZIOSO SWITZERLAND AG, Steinhausen (CH)

(72) Inventor: Daliang Zhang, Guangdong (CN)

(73) Assignee: BAMBINO PREZIOSO SWITZERLAND AG, Steinhausen (CH)

( * ) Notice: Subject to any disclaimer, the term of this patent is extended or adjusted under 35 U.S.C. 154(b) by 0 days.

(21) Appl. No.: 18/033,281

(22) PCT Filed: Oct. 15, 2021

(86) PCT No.: PCT/EP2021/078606
§ 371 (c)(1),
(2) Date: Apr. 21, 2023

(87) PCT Pub. No.: WO2022/084180
PCT Pub. Date: Apr. 28, 2022

(65) Prior Publication Data
US 2023/0391233 A1   Dec. 7, 2023

(30) Foreign Application Priority Data
Oct. 23, 2020   (CN) .......................... 202011145708.8

(51) Int. Cl.
*B60N 2/26*   (2006.01)
*B60N 2/28*   (2006.01)

(52) U.S. Cl.
CPC .......... *B60N 2/268* (2023.08); *B60N 2/2821* (2013.01); *B60N 2/2869* (2013.01)

(58) Field of Classification Search
CPC .............................. B60N 2/268; B60N 2/2824
See application file for complete search history.

(56) References Cited

U.S. PATENT DOCUMENTS

| 7,819,472 B2 | 10/2010 | Hutchinson et al. |
| 9,168,849 B2 | 10/2015 | Chen |
| 9,221,368 B2 | 12/2015 | Hou et al. |
| (Continued) | | |

FOREIGN PATENT DOCUMENTS

| CN | 101391583 A | 3/2009 |
| CN | 203267824 U | 11/2013 |
| (Continued) | | |

OTHER PUBLICATIONS

International Search Report and Written Opinion for Application No. PCT/EP2021/078606 dated Feb. 4, 2022.

(Continued)

*Primary Examiner* — Timothy J Brindley
(74) *Attorney, Agent, or Firm* — Volpe Koenig

(57) ABSTRACT

A safety indicator is adapted for a child safety seat having a base, a seat body latched to the base, and a support leg pivotally connected to the base. The safety indicator includes a display mechanism disposed at a front end of the base and having an indicating window, and a first indicating mechanism provided on the base and having different indicating areas selectively corresponding to the indicating window. The different indicating areas indicate different use positions of the base.

11 Claims, 11 Drawing Sheets

(56) References Cited

U.S. PATENT DOCUMENTS

| | | | |
|---|---|---|---|
| 9,873,359 B2 | 1/2018 | Williams et al. | |
| 10,322,651 B2 | 6/2019 | Hutchinson et al. | |
| 2008/0054694 A1 | 3/2008 | Lhomme et al. | |
| 2014/0001800 A1 | 1/2014 | Mo | |
| 2014/0327281 A1 | 11/2014 | Hou et al. | |
| 2024/0270127 A1* | 8/2024 | Mo | B60N 2/2824 |

FOREIGN PATENT DOCUMENTS

| | | | | |
|---|---|---|---|---|
| CN | 103507671 A | | 1/2014 | |
| CN | 103619648 A | | 3/2014 | |
| CN | 204978307 U | | 1/2016 | |
| CN | 109398174 A | * | 3/2019 | B60N 2/2824 |
| CN | 109624803 A | | 4/2019 | |
| CN | 110126687 A | | 8/2019 | |
| CN | 110371077 A | | 10/2019 | |
| CN | 110588459 A | | 12/2019 | |
| CN | 210792882 U | | 6/2020 | |
| CN | 112208405 A | | 1/2021 | |
| CN | 116022042 A | | 4/2023 | |
| CN | 116811690 A | | 9/2023 | |
| CN | 117048459 A | * | 11/2023 | B60N 2/2824 |
| DE | 202013103189 U1 | | 11/2013 | |
| DE | 102017113024 A1 | | 12/2017 | |
| EP | 2210769 A2 | | 7/2010 | |
| ES | 2551915 T3 | | 11/2015 | |
| GB | 2530375 B | | 8/2020 | |
| TW | 201623045 A | | 7/2016 | |
| TW | I574863 B | | 3/2017 | |
| TW | I624386 B | | 5/2018 | |
| WO | 2011119481 A1 | | 9/2011 | |
| WO | 2012172001 A1 | | 12/2012 | |
| WO | 2021090313 A1 | | 5/2021 | |
| WO | 2022084180 A1 | | 4/2022 | |
| WO | 2023073093 A1 | | 5/2023 | |

OTHER PUBLICATIONS

Taiwanese Office Action for Application No. 110137922 dated Aug. 16, 2022.

Office Action Issued in Corresponding Taiwanese Patent Application No. 112135893, Mailed Date: Mar. 13, 2024, 34 pages.

Notification of Registration Issued in Corresponding Chinese Patent Application No. 202011145708.8, Mailed Date: Jun. 12, 2024, 12 pages.

Ruhai, et al. "A Review of Child Restraint Devices for Vehicles", China Safety Science Journal, vol. 16, Issue 4, 2006, 4 pages.

Office Action issued in corresponding Chinese Application No. 202011145708.8 dated Nov. 13, 2023. English translation included.

"First Office Action Issued in Corresponding European Patent Application No. 21797963.2", Mailed Date: Jul. 9, 2025, 6 pages.

* cited by examiner

SAFETY INDICATOR AND CHILD SAFETY SEAT HAVING THE SAME

CROSS-REFERENCE TO RELATED APPLICATIONS

This application is a 371 National Stage of International Patent Application No. PCT/EP2021/078606, filed on Oct. 15, 2021, which claims the benefit of Chinese Patent Application No. 202011145708.8, filed Oct. 23, 2020, entitled, "SAFETY INDICATOR AND CHILD SAFETY SEAT HAVING THE SAME", the entire content of which [is] are incorporated herein by reference.

TECHNICAL FIELD

The present disclosure relates to the technical field of children's products, particularly, to a safety indicator and a child safety seat having the safety indicator.

BACKGROUND

Only when a child safety seat is used properly, can it protect children. The child safety seat mainly includes a base, a seat body latched on the base, and a support leg connected below the base. In use, the base is connected to an automobile seat, and the seat body may be latched on the base in a forward or reverse direction. The support leg is stretched by means of pivot and abuts against the floor of the automobile to function as a support.

At present, most child safety seats are not provided with a warning device to indicate installation and use state. During installation, whether the seat body and the base are latched in place, and whether the support leg firmly abuts against the floor of the automobile depend on a subjective judgment of the user. It may easily cause a risk to a seated child due to a human false judgment. In addition, the continuous bumping of the automobile during driving may easily cause a position of the safety seat to shift, which will cause the support leg to be not well supported on the floor of the automobile. If the situation cannot be monitored, found, and adjusted in time, it will cause the safety issue of the safety seat as well.

Some currently commercially available child safety seats have partial indicating functions, such as an indicator that displays a connection state of the ISOFIX connector. The indicator, matching with the ISOFIX connector, is generally arranged at a side of the safety seat. An indicator that displays the supporting state of the support leg may also be provided, and the indicator is generally arranged at the bottom of the support leg. The configuration of the indicators above are arranged relatively dispersedly, and it is inconvenient to monitor the indicators during using the child safety seat, which makes it difficult to monitor the indicators in time and conveniently to find problems.

SUMMARY

According to some embodiments, a safety indicator and a child safety seat having the safety indicator are provided.

A safety indicator is adapted for a child safety seat having a base, a seat body latched to the base, and a support leg pivotally connected to the base. The safety indicator includes a display mechanism provided at a front end of the base and having an indicating window, and a first indicating mechanism provided on the base and having different indicating areas selectively corresponding to the indicating window selectively. The different indicating areas indicate different use positions of the base.

Another safety indicator is adapted for a child safety seat having a base, a seat body latched to the base, and a support leg pivotally connected to the base. The safety indicator includes a first indicating mechanism configured to indicate a use position of the base, a second indicating mechanism configured to indicate an engagement state between the base and the seat body, a third indicating mechanism configured to indicate a use state of the support leg, and a display mechanism provided at a front end of the base and having a plurality of indicating windows. The first indicating mechanism, the second indicating mechanism, and the third indicating mechanism respectively have different indicating areas, and each of the plurality of indicating windows is configured to display the different indicating areas of the first indicating mechanism, the second indicating mechanism, and the third indicating mechanism.

A child safety seat includes a base, a seat body latched to the base, a support leg pivotally connected to the base, and the above-mentioned safety indicator.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

Figure 1:
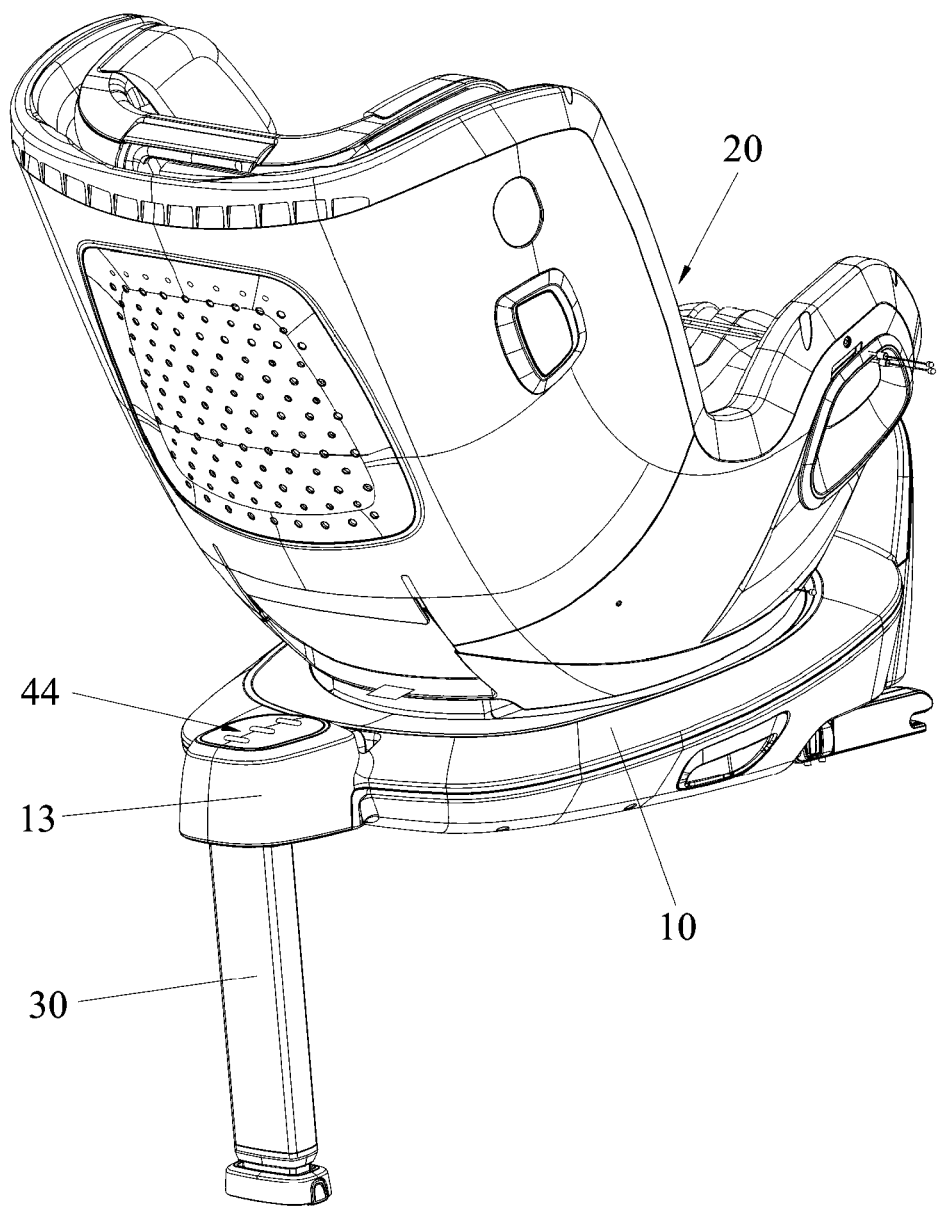
FIG. 1 is a perspective view of an embodiment of a child safety seat.
Figure 2:
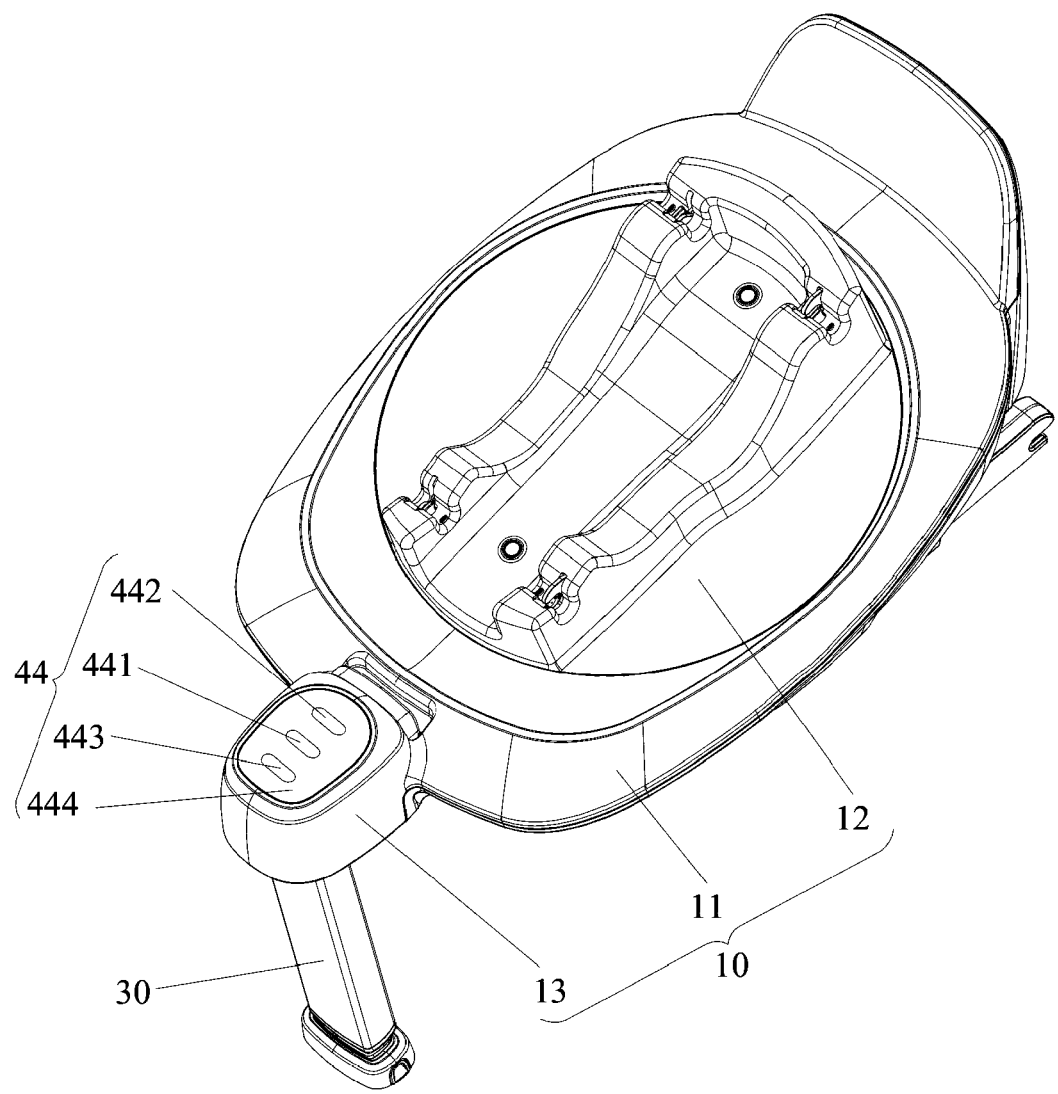
FIG. 2 is a perspective view of FIG. 1 after a seat body is removed.
Figure 3:
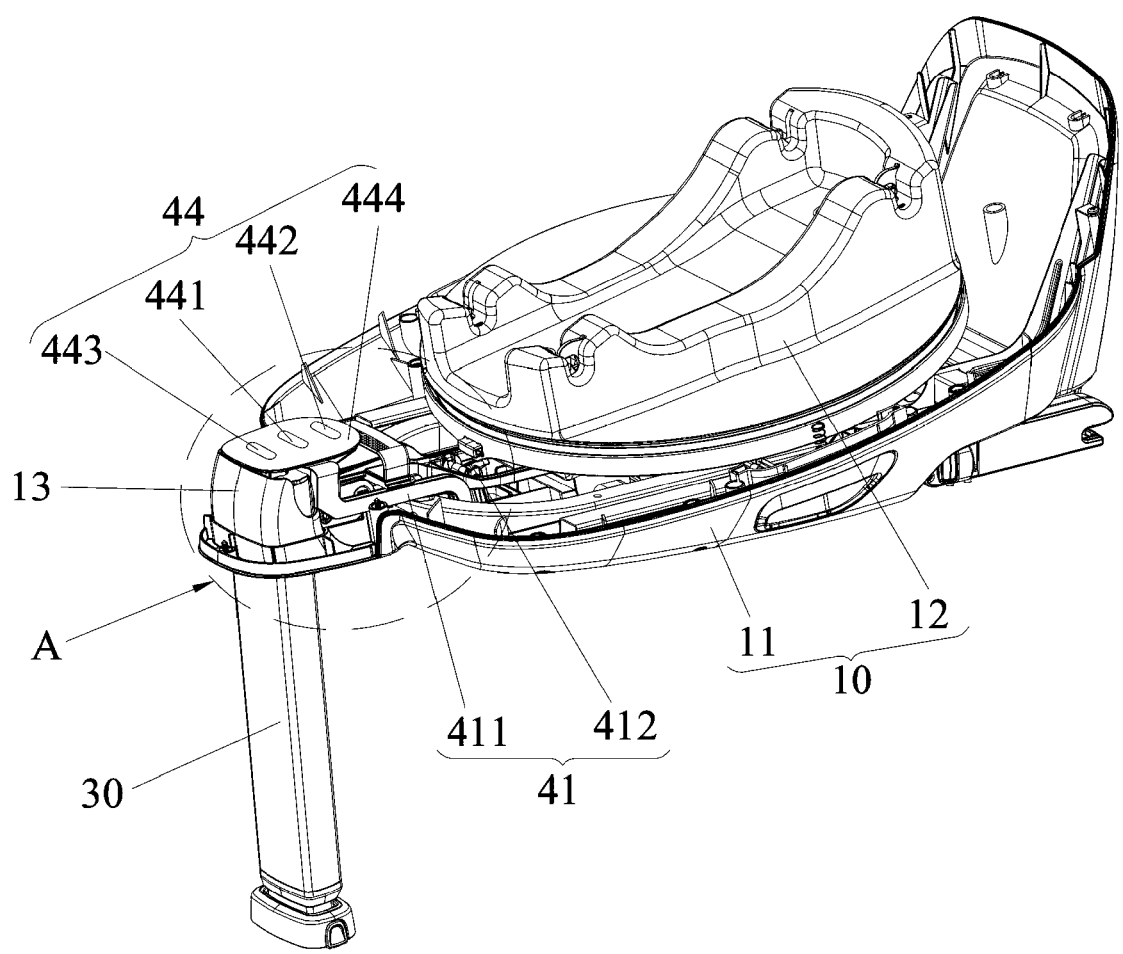
FIG. 3 is a perspective view of FIG. 2 after an upper cover of a seat body support is removed.
Figure 4:
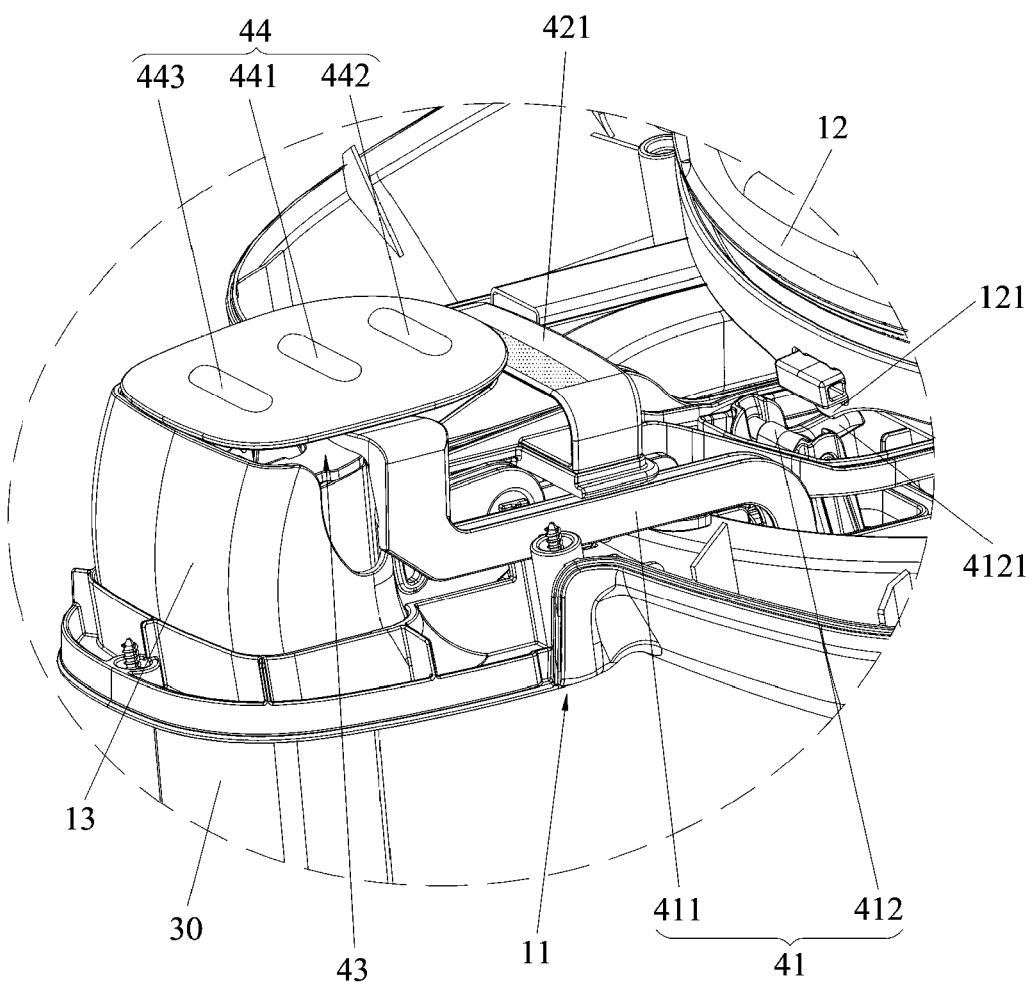
FIG. 4 is an enlarged view of part A in FIG. 3.
Figure 5:
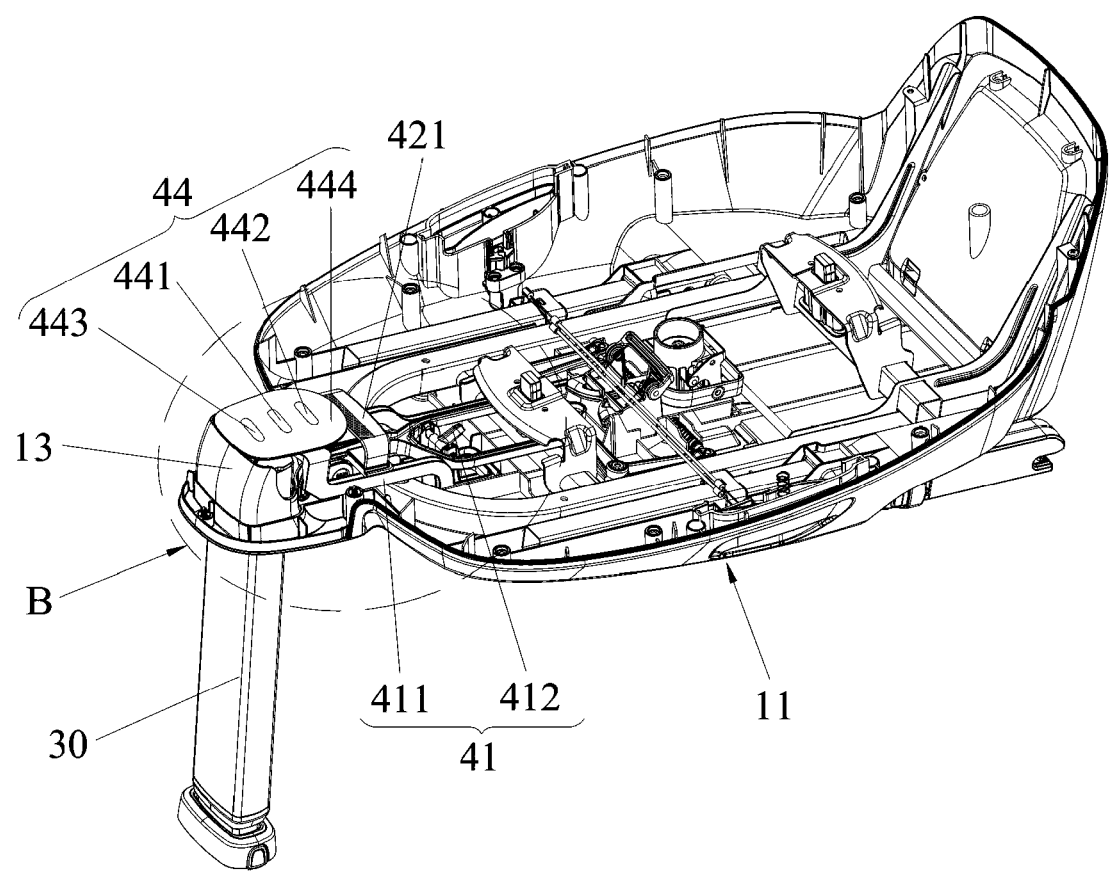
FIG. 5 is a perspective view of FIG. 3 after a rotatable base body is further removed.

Embodiments of the invention are described more fully hereinafter with reference to the accompanying drawings. The various embodiments of the invention may, however, be embodied in many different forms and should not be construed as limited to the embodiments set forth herein. Rather, these embodiments are provided so that this disclosure will be thorough and complete, and will fully convey the scope of the invention to those skilled in the art. Elements that are identified using the same or similar reference characters refer to the same or similar elements.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The above and other objects and features of the present invention will become apparent and more readily appreciated from the following description of the embodiments with reference to the following figures, wherein like reference numerals refer to like parts throughout the various figures unless otherwise specified. As shown in FIGS. 1 to 10, a safety indicator 40 provided by an embodiment is mainly adapted for but is not limited to a child safety seat 1, and may also be applied to other child carriers.

Figure 6:
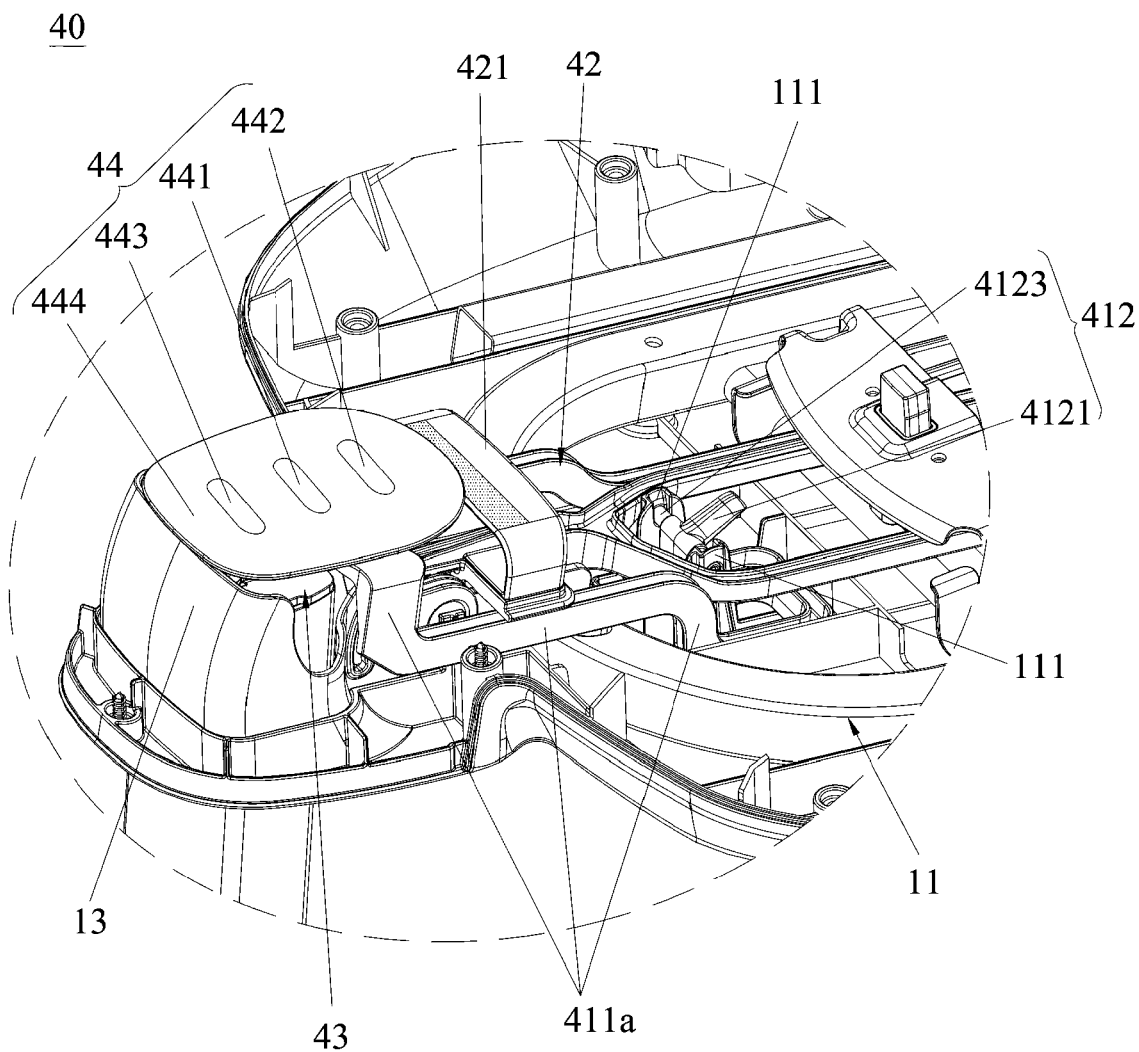
FIG. 6 is an enlarged view of part B in FIG. 5.
Figure 7:
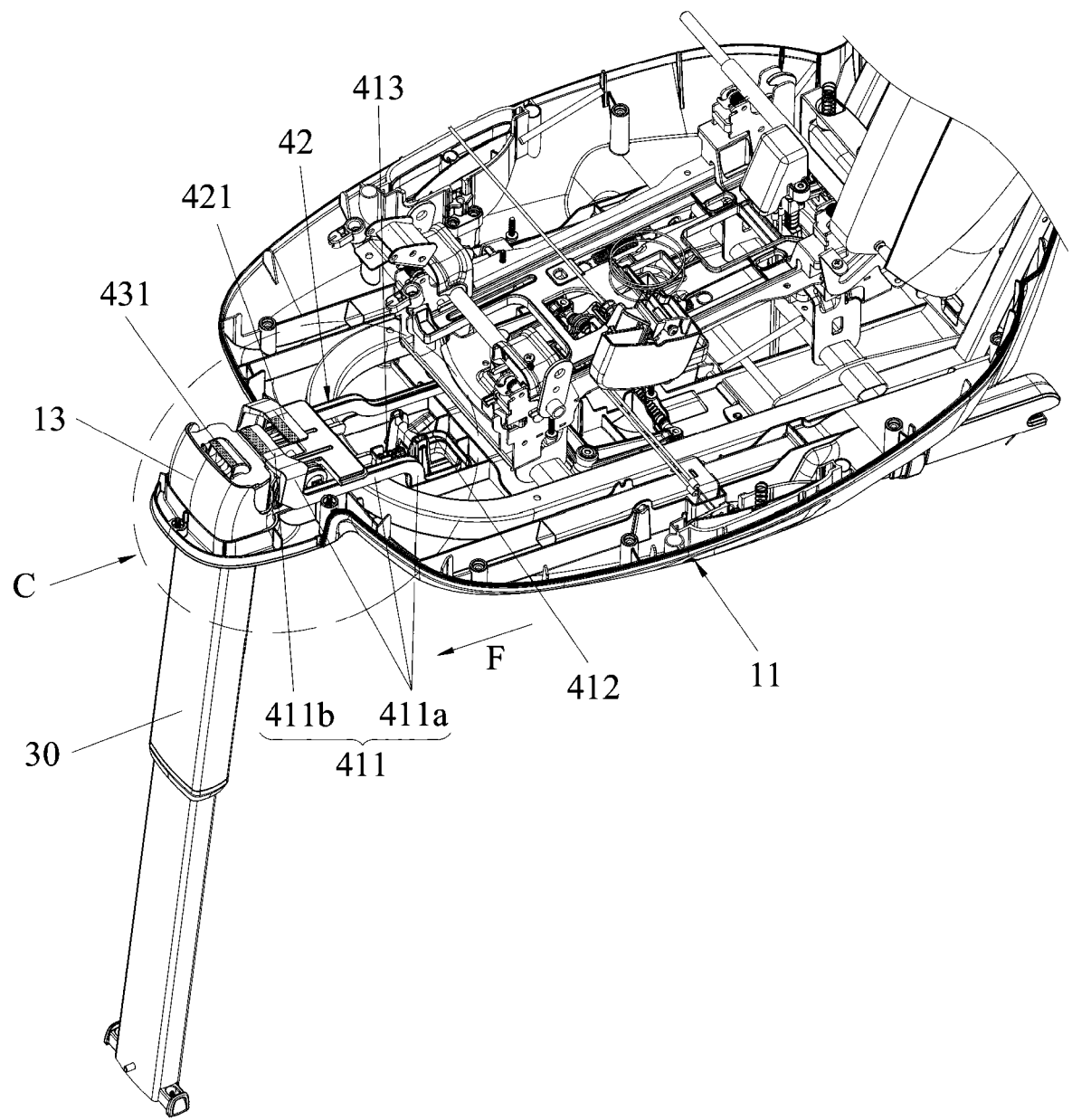
FIG. 7 is an enlarged view of FIG. 5 in another view angle.
Figure 8:
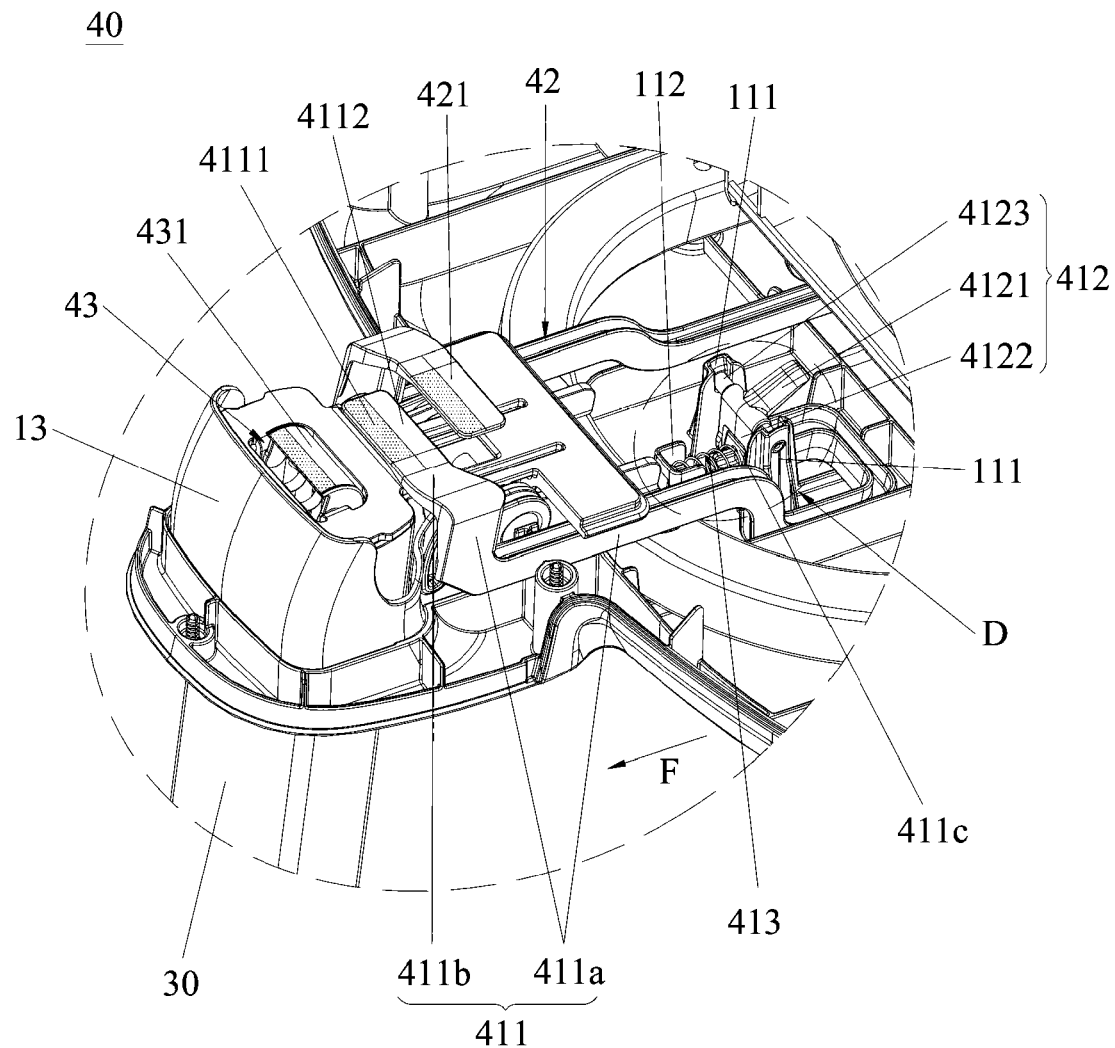
FIG. 8 is an enlarged view of part C in FIG. 7.

As shown in FIGS. 1 to 2 and 5 to 8, an embodiment of the child safety seat 1 includes a base 10, a seat body 20, a support leg 30, and a safety indicator 40 (see FIGS. 6 and 8). The seat body 20 and the base 10 are detachably latched to each other, and the seat body 20 may rotate relative to the base 10, thus it has many different use positions. The support leg 30 is pivotally connected to a front end of the base 10. The support leg 30 has a telescopic structure, such that it may be folded at the bottom of the base 10 (see FIG. 1), or may be stretched to be supported by a floor of a vehicle (see FIG. 7).

The base 10 includes a seat body support 11, and a rotatable base body 12 rotatably connected to the seat body support 11. The seat body 20 is installed on the rotatable base body 12. The rotation of the rotatable base body 12 allows the seat body 20 to be in a forward, a reverse, or any other use positions. As shown in FIG. 1, the forward use position is that a backrest of the seat body 20 rotates to a position away from the support leg 30, and the reverse use position is that the backrest of the seat body 20 rotates to a position adjacent to the support leg 30. It should be understood that, the rotatable base body 12 may also allow the seat body 20 to be in any position between the forward direction and the reverse direction. The safety indicator 40 is configured to indicate the use position of the base 10, that is, to indicate the use position of the seat body 20. Furthermore, the safety indicator 40 is also configured to indicate an engagement state between the seat body 20 and the base 10 and a use state of the support foot 30. In other words, the above-mentioned states are concentrated displayed, thus facilitating observation by the user.

As shown in FIGS. 1 to 10, in an embodiment, the safety indicator 40 includes a first indicating mechanism 41 and a display mechanism 44. The display mechanism 44 is provided at a front end of the base 10 and has an indicating window 441. The first indicating mechanism 41 is provided on the base 10 and has different indicating areas 4111, 4112 corresponding to the indicating window 441. The different indicating areas 4111, 4112 may indicate different use positions of the base 10. Since the position of the seat body 20 of this embodiment is adjusted by rotation of the rotatable base body 12, the first indicating mechanism 41 may be activated by the rotation of the rotatable base body 12, and further the use position of the base 10 is displayed by indicating the position of the seat body 20.

Referring to FIGS. 1 to 10, in this embodiment, the safety indicator 40 further includes a second indicating mechanism 42 and a third indicating mechanism 43. The second indicating mechanism 42 is configured to indicate an engagement state between the base 10 and the seat body 20. The third indicating mechanism 43 is configured to indicate the use state of the support leg 30. The display mechanism 44 is disposed at the front end of the base 10 and has multiple indicating windows 441, 442, 443, and the first indicating mechanism 41, the second indicating mechanism 42, and the third indicating mechanism 43 have indicating members 411, 421, 431 respectively. Wherein, each of the indicating members 411, 421, 431 has different indicating areas. The indicating windows 441, 442, 443 of the display mechanism 44 are configured to respectively display different indicating areas of the indicating members 411, 421, 431 of the first indicating mechanism 41, the second indicating mechanism 42, and the third indicating mechanism 43. By monitoring which indicating area of the indicating members 411, 421, 431 is displayed in each indicating window, the latching connection and use states of the base 10 can be clearly determined, which is convenient for user's observation.

As shown in FIG. 1, a pivot seat 13 is disposed at the front end of the base 10 for pivotally connecting the support leg 30, and the display mechanism 44 is disposed on the top surface of the pivot seat 13. Specifically, the display mechanism 44 has a first indicating window 441, a second indicating window 442, and a third indicating window 443, which are arranged at intervals on a display panel 444. The first indicating window 441 is configured to display the first indicating member 411 of the first indicating mechanism 41; the second indicating window 442 is configured to display the second indicating member 421 of the second indicating mechanism 42; and the third indicating window 443 is configured to display the third indicating member 431 of the third indicating mechanism 43. In addition, indication signs and warning signs etc., may be further provided on the display panel 444. For example, the indication signs are arranged adjacent to the first indicating window 441, the second indicating window 442, and the third indicating window 443, respectively, so as to indicate which state they are displaying, thus facilitating observation by the user. In addition, the warning sign may be provided on the display panel 444, so as to remind the user which indicating area of the indicating member is in a correct state.

More specifically, each of the indicating members 411, 421, 431 has a first indicating area and a second indicating area that can be selectively aligned with the indicating window 441, 442, 443, respectively. By displaying the first indicating area or the second indicating area in the indicating window 441, 442, 443, different states of the first indicating mechanism 41, the second indicating mechanism 42, and the third indicating mechanism 43 may be shown.

As shown in FIGS. 1 to 9, the first indicating mechanism 41 is configured to indicate whether the seat body 20 is in a correct use position, that is, whether the base 10 is in the correct use position. As used herein, the correct use position (i.e., the first use position) refers to a reverse use position of the seat body 20 shown in FIG. 1 after the rotation of the rotatable base body 12, or a forward use position of the seat body 20 after the seat body 20 shown in FIG. 1 rotates for 180 degrees. When the seat body 20 is in the forward or reverse use position, it allows a baby to be seated in the vehicle. Of course, through the rotation of the rotatable base body 12, the seat body 20 may also be located at any position between the forward and reverse use positions, such that a caretaker may carry the baby on or off the vehicle or take care the baby.

As shown in FIGS. 3 to 8, the first indicating mechanism 41 includes the first indicating member 411 and a trigger 412 connected to each other. The trigger 412 is movably provided inside the base 10, and the first indicating member 411 is slidably connected to the base 10. An end of the first indicating member 411 away from the trigger 412 is provided with the first indicating area 4111 and the second indicating area 4112 (see FIG. 8). When subjected to a force, the trigger 412 acts and drives the first indicating member 411 to slide, such that the first indicating area 4111 or the second indicating area 4112 is aligned with the first indicating window 441, i.e. shown by the indicating window 441. The first indicating area 4111 and the second indicating area 4112 may be configured to have different colors, patterns, or other warning signs. For example, in an embodiment, the first indicating area 4111 is configured to be red, and the second indicating area 4112 is configured to be green, so as to distinguish different indicating areas.

The first indicating member 411 has a first position and a second position. When the first indicating member 411 is in the first position, the first indicating area 4111 (red) of the first indicating member 411 is aligned with the first indicating window 441. Meanwhile, the seat body 20 is in an incorrect use position, that is, the base 10 is in an incorrect use position. When the seat body 20 rotates to the correct use position, the rotatable base body 12 may activate the trigger 412, which drives the first indicating member 411 to slide from the first position to the second position. Meanwhile, the second indicating area 4112 (green) on the first indicating member 411 is aligned with the first indicating window 441.

Furthermore, the first indicating mechanism 41 also includes a reset member 413. The reset member 413 abuts against the first indicating member 411, such that the first indicating member 411 always has a tendency to move towards the first position.

Referring to FIGS. 5 to 9, the trigger 412 is pivotally connected to the base 10 via a pivot 4123, and the trigger 412 has an abutting end 4121 and a connecting end 4122. The abutting end 4121 and the connecting end 4122 form an angle with respect to the pivot 4123. The connecting end 4122 is pivotally connected to an end of the first indicating member 411. When the abutting end 4121 is subjected to a force, it drives the trigger 412 to rotate about the pivot 4123, and enables the connecting end 4122 of the trigger 412 to swing, thus driving the first indicating member 411 to slide.

Figure 9:
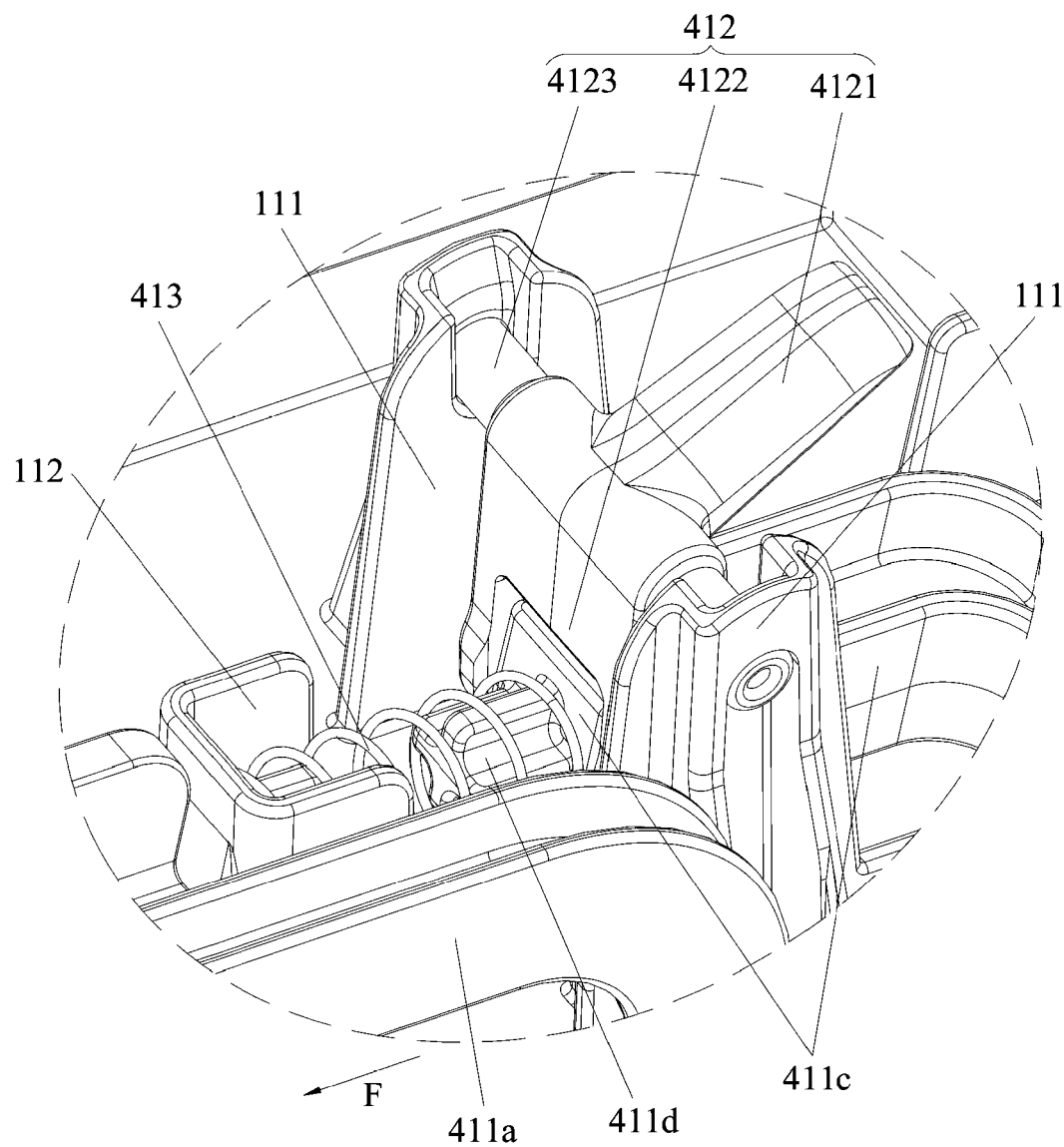
FIG. 9 is an enlarged view of part D in FIG. 8.

As shown in FIG. 9, two stands 111 are spaced apart and provided inside the base 10 and protrude from the base 10, and both ends of the pivot 4123 are pivotally connected to the two stands 111, respectively. The connecting end 4122 has a through groove allowing an end of the first indicating member 411 to extend through and to be pivotally connected to the connecting end 4122. In addition, a positioning element 112 is also disposed inside the base 10 and protrudes from the base 10. The positioning element 112 is located in front of and between the two stands 111, and is configured to position the reset member 413.

Referring to FIGS. 2 to 9, the first indicating member 411 has a step-shaped connecting body 411a, that is, the connecting body 411a is step-shaped in a sliding direction thereof. The connecting body 411a is slidably latched to the seat body support 11, and an end of the connecting body 411a is provided with an indicating end 411b perpendicular to the connecting body 411a. An extending direction of the indicating end 411b is perpendicular to the sliding direction of the connecting body 411a. The indicating end 411b is located below the first indicating window 441. The first indicating area 4111 and the second indicating area 4112 are arranged on the surface of the indicating end 411b. The other end of the connecting body 411a is provided with a pivot end 411c parallel to the connecting body 411a, that is, an extending direction of the pivot end 411c is the same as the sliding direction of the connecting body 411a. The pivot end 411c extends through the through groove of the connecting end 4122 of the trigger 412 and is pivotally connected to the connecting end 4122. When the trigger 412 rotates, it drives the pivot end 411c to slide, thereby driving the first indicating member 411 to slide as a whole.

More specifically, the pivot end 411c further has a positioning portion 411d, and one end of the reset member 413 abuts against the positioning portion 411d so as to position the positioning portion 411d. The positioning portion 411d may be a protrusion, a groove, or any other structure, which is not specifically limited. As shown in FIG. 9, in this embodiment, the positioning portion 411d is a convex post protruding from the pivot end 411c. One end of the reset member 413 is sleeved on the positioning portion 411d and abuts against the end of the pivot end 411c, and the other end of the reset member 413 abuts against the locating element 112. When the first indicating member 411 is driven by the trigger 412 to slide from the first position to the second position, the reset member 413 is pressed and deforms, and when the reset member 413 is restored, it pushes the first indicating member 411 to slide towards the first position thereof.

As shown in FIGS. 3 to 4 and FIGS. 7 to 9, both of the front and rear ends of the rotatable base body 12 have protrusions 121 (see FIG. 4), respectively. When the rotatable base body 12 rotates to the forward use position or the reverse use position of the seat body 20, the protrusion 121 will press the abutting end 4121 of the trigger 412, driving the trigger 412 to rotate, and the connecting end 4122 of the trigger 412 will drive the first indicating member 411 to slide in the direction indicated by an arrow F in FIGS. 7 to 9. When the first indicating member 411 slides to the second position thereof, the second indicating area 4112 (green) is aligned with the first indicating window 441, indicating that the seat body 20 (or the base 10) is in a correct position. When the rotatable base body 12 rotates to a position deviated from the forward or reverse use position, the protrusion 121 will be disengaged from the abutting end 4121 of the trigger 412. At this time, the abutting end 4121 is free from the force, and the reset member 413 is restored and pushes the first indicating member 411 to slide along an opposite direction of the direction indicated by the arrow F in FIGS. 7 to 9 to reset, as well as the first indicating member 411 drives the trigger 412 to rotate and reset. When the first indicating member 411 slides to the first position thereof, the first indicating area 4111 (red) is aligned with the first indicating window 441, indicating that the seat body 20 (or the base 10) is in an incorrect use position at this time.

Figure 10:
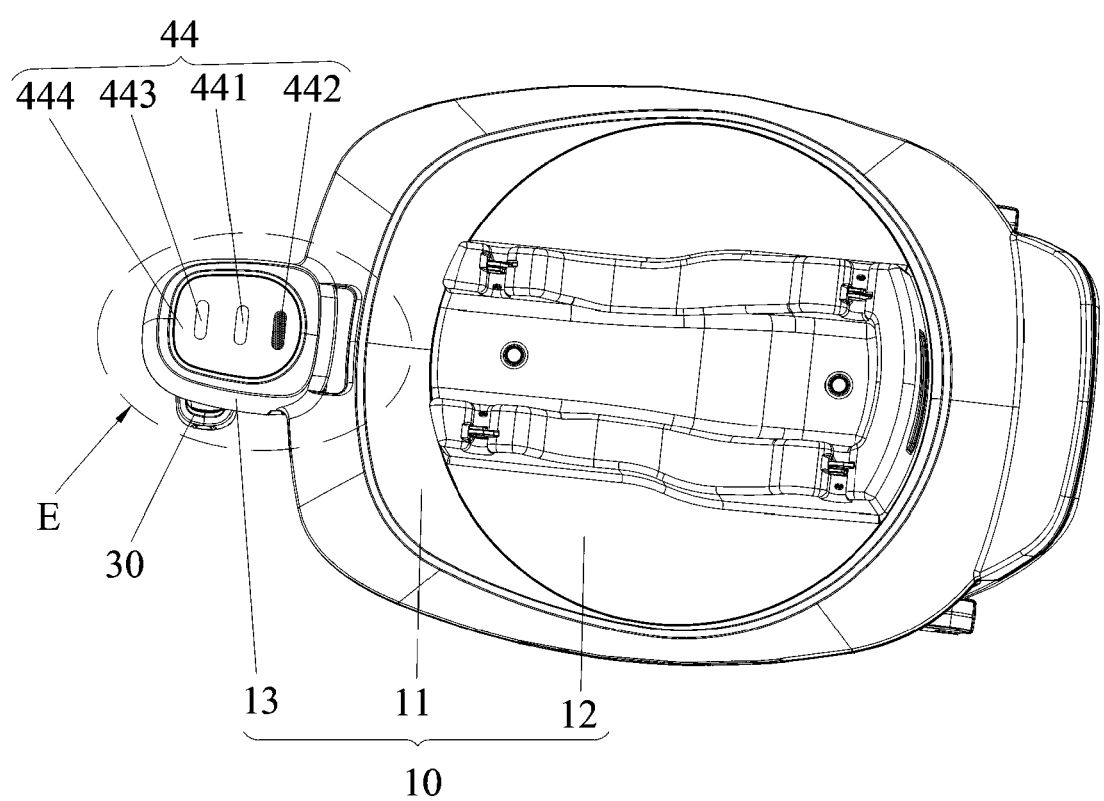
FIG. 10 is a top view of FIG. 2.
Figure 11:
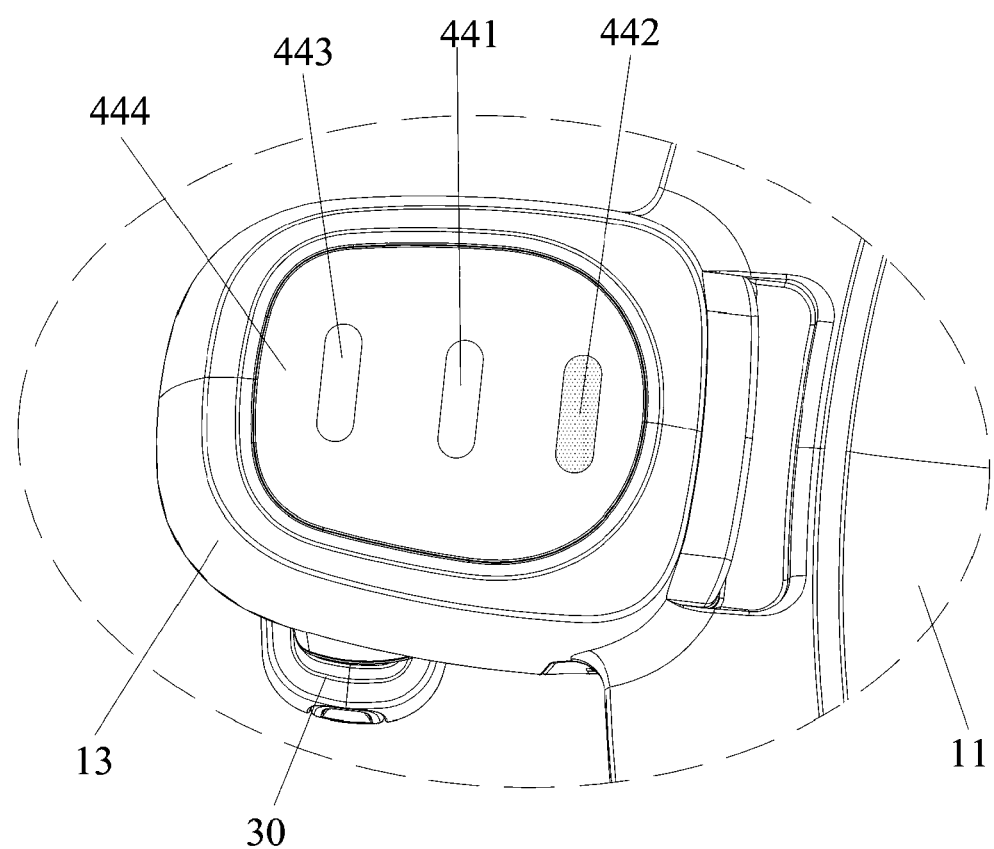
FIG. 11 is an enlarged view of part E in FIG. 10.

As shown in FIGS. 3 to 11, the second indicating mechanism 42 has a second indicating member 421. The second indicating member 421 is slidably connected to an engagement mechanism arranged between the base 10 and the seat body 20. One end of the second indicating member 421 has a first indicating area and a second indicating area, which extends to the bottom of the display panel 444. The arrangement of the indicating areas on the second indicating member 421 is the same as that of the first indicating member 411, and will not be described repeatedly herein. When the seat body 20 is not installed on the base 10, the first indicating area on the second indicating member 421 is aligned with the second indicating window 442, that is, the red area of the second indicating member 421 is aligned with the second indicating window 442, as shown in FIGS. 10 to 11. When the seat body 20 is installed on the base 10, the engagement mechanism therebetween is engaged, the second indicating member 421 will be driven to move, such that the second indicating area (i.e. the green area) of the second indicating member 421 is aligned with the second indicating window 442, indicating that the seat body 20 is installed in place.

Correspondingly, the third indicating mechanism 43 has a third indicating member 431. The third indicating member 431 is connected to the support leg 30 and has a first indicating area and a second indicating area that may be aligned with the third indicating window 443 selectively. The arrangement of the indicating areas on the third indicating member 431 is the same as that of the first indicating member 411, and will not be described repeatedly herein. When the support leg is not supported on the floor of the vehicle, the first indicating area (i.e. the red area) of the third indicating member 431 is aligned with the third indicating window 443. When the support leg 30 is supported on the floor of the vehicle, the support leg 30 acts on the third indicating member 431, such that the second indicating area (i.e. the green area) is aligned with the third indicating window 443, indicating that the support leg 30 is supported in place.

The work principle of the safety indicator 40 of the child safety seat 1 will be described with reference to FIGS. 1 to 11.

As shown in FIGS. 10 to 11, when the seat body 20 is not installed on the base 10, the first indicating area (i.e. the red area) on the second indicating member 421 is aligned with the second indicating window 442. When the seat body 20 is installed on the base 10 by means of the engagement mechanism therebetween, the engagement mechanism drives the second indicating member 421 to move, such that the second indicating area (green area) on the second indicating member is aligned with the second indicating window 442, indicating that the seat body 20 is installed in place.

During use, the seat body 20 may be used in a forward or reverse direction, that is, the rotation of the rotatable base body 12 drives the seat body 20 to rotate, thus adjusting the position of the seat body 20. When the seat body 20 rotates to the forward or the reverse use position, the protrusion 121 on the rotatable base body 12 presses the abutting end 4121 of the trigger 412, and forces the trigger 412 to rotate, thus driving the first indicating member 411 to slide along the direction indicated by the arrow F shown in FIGS. 7 to 9, such that the second indicating area 4112 (green area) on the first indicating member 411 is aligned with the first indicating window 441, as shown in FIGS. 10 to 11, i.e., it is indicated that, at this time, the base 10 is in the correct position. In the aforementioned sliding process, the first indicating member 411 presses the reset member 413 and forces the reset member 413 to deform. When the seat body 20 rotates to any position between the forward and reverse use positions, the protrusion 121 on the rotatable base body 12 is disengaged from the abutting end 4121 of the trigger 412. At this time, the first indicating member 411 is pushed to slide under the action of the elastic restoring force of the reset member 413, such that the first indicating area 4111 (red area) is aligned with the first indicating window 441, which indicates that the base 10 is in an incorrect position.

Correspondingly, when the support leg 30 rotates to be supported on the floor of the vehicle, the support leg 30 abuts against the floor and drives the third indicating member 431 to move, such that the second indicating area (green area) of the third indicating member 431 is aligned with the third indicating window 443, as shown in FIGS. 10 to 11. When the support leg 30 is loose and does not abuts against the floor properly, the third indicating member 431 is free from the force and automatically resets, such that the first indicating area (red area) is aligned with the third indicating window 443.

According to the above description, since the first indicating window 441, the second indicating window 442, and the third indicating window 443 are concentratedly provided on the top of the pivot seat 13 arranged at the front end of base 10, it is convenient for users to monitor various states of the child safety seat 1 during installing or use of the child safety seat 1.

In summary, according to the safety indicator 40 of this embodiment, since the first indicating mechanism 41 and the display mechanism 44 are provided, the use position of the base 10 may be indicated by the indicating area of the first indicating mechanism 41, thus making it convenient for the user to monitor whether the seat body 20 is in the correct use position during installing and use, thereby ensuring a correct use of the child safety seat 1, and improving safety of driving. The safety indicator 40 further has the second indicating mechanism 42 and the third indicating mechanism 43. The display mechanism 44 is located at the front end of the base 10, and the display mechanism 44 has a plurality of indicating windows, which are configured to display different indicating areas of the first indicating mechanism 41, the second indicating mechanism 42, and the third indicating mechanism 43, therefore the use position of the base 10, the engagement state between the base 10 and the seat body 20, and the use state of the support leg 30 are concentratedly displayed, thereby making it convenient to monitor all states during the installing and use of the child safety seat 1, helping to find problems and ensuring the safety of the child safety seat 1, and further improving the safety of driving. Moreover, the safety indicator 40 has a simple structure.

Correspondingly, the child safety seat 1 provided with the above safety indicator 40 also has the same benefits.

The structures of other parts of the child safety seat 1 are all well known to those of ordinary skill in the art, and will not be described in detail herein.

Although the respective embodiments have been described one by one, it shall be appreciated that the respective embodiments will not be isolated. Those skilled in the art can apparently appreciate upon reading the disclosure of this application that the respective technical features involved in the respective embodiments can be combined arbitrarily between the respective embodiments as long as they have no collision with each other. Of course, the respective technical features mentioned in the same embodiment can also be combined arbitrarily as long as they have no collision with each other.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A safety indicator, adapted for a child safety seat having a base, a seat body latched to the base, and a support leg pivotally connected to the base, the safety indicator comprising:

a display mechanism disposed at a front end of the base and having an indicating window; and a first indicating mechanism provided on the base and having different indicating areas selectively corresponding to the indicating window, the different indicating areas indicating different use positions of the base;

wherein the first indicating mechanism comprises a first indicating member slidably connected to the base, the first indicating member has a first indicating area and a second indicating area aligned with the indicating window selectively;

wherein the first indicating mechanism further comprises a trigger movably connected to the base, the trigger is connected to the first indicating member, when subjected to a force, the trigger drives the first indicating member to slide, such that the first indicating area or the second indicating area is aligned with the indicating window;

wherein the trigger is pivotally connected to the base and has an abutting end and a connecting end, the abutting end and the connecting end form an angle with respect to a pivot of the trigger, the connecting end is connected to one end of the first indicating member, when subjected to the force, the abutting end enables the trigger to rotate, so as to drive the first indicating member to slide.

2. The safety indicator of claim 1, wherein when the base is in a first use position, the trigger is activated to drive the first indicating member to slide, such that the second indicating area is aligned with the indicating window.

3. A safety indicator, adapted for a child safety seat having a base, a seat body latched to the base, and a support leg pivotally connected to the base, the safety indicator comprising:

a first indicating mechanism configured to indicate a use position of the base;

a second indicating mechanism configured to indicate an engagement state between the base and the seat body;

a third indicating mechanism configured to indicate a use state of the support leg; and a display mechanism provided at a front end of the base and having a plurality of indicating windows;

wherein the first indicating mechanism, the second indicating mechanism, and the third indicating mechanism have different indicating areas, respectively, and each of the plurality of indicating windows is configured to display the different indicating areas of the first indicating mechanism, the second indicating mechanism, and the third indicating mechanism;

wherein each of the first indicating mechanism, the second indicating mechanism, and the third indicating mechanism has an indicating member, and each indicating member has a first indicating area and a second indicating area aligned with the corresponding indicating window selectively;

wherein the first indicating mechanism further comprises a trigger movably connected to the base, the indicating member is slidably connected to the base and connected to the trigger, when subjected to a force, the trigger drives the indicating member connected thereto to slide, such that the first indicating area or the second indicating area is aligned with the indicating window;

wherein the trigger is pivotally connected to the base and has an abutting end and a connecting end, the abutting end and the connecting end form an angle with respect to a pivot of the trigger, the connecting end is connected to one end of the first indicating member, when subjected to the force, the abutting end enables the trigger to rotate, so as to drive the first indicating member to slide.

4. The safety indicator of claim 3, wherein when the base is in a first use position, the trigger is activated to drive the indicating member connected thereto to slide, such that the second indicating area is aligned with the indicating window.

5. The safety indicator of claim 3, wherein the indicating member of the second indicating mechanism is connected to an engagement mechanism located between the base and the seat body, the engagement mechanism, when engaged or separated, drives the indicating member of the second indicating mechanism to move.

6. The safety indicator of claim 3, wherein the indicating member of the third indicating mechanism is connected to the support leg, the support leg, when supported on a vehicle floor, drives the indicating member of the third indicating mechanism to act.

7. A child safety seat, comprising:
a base;
a seat body latched to the base;
a support leg pivotally connected to the base; and
the safety indicator of claim 1.

8. The child safety seat of claim 7, wherein the base comprises a seat body support and a rotatable base body rotatably connected to the seat body support, the first indicating mechanism is activated by rotation of the rotatable base body.

9. The child safety seat of claim 8, wherein the first indicating mechanism comprises a trigger and a first indicating member, the first indicating member is slidably connected to the seat body support and has a first indicating area and a second indicating area, the trigger is movably connected to the seat body support and connected to the first indicating member, the trigger, when activated by the rotatable base body, drives the first indicating member to slide, such that the first indicating area or the second indicating area is aligned with the indicating window.

10. The child safety seat of claim 9, wherein a front end and a rear end of the rotatable base body have protrusions, respectively, when the rotatable base body rotates to a forward or a reverse use position, the protrusion presses the trigger to drive the indicating member to slide, such that the second indicating area is aligned with the indicating window.

11. The child safety seat of claim 8, wherein a pivot seat is disposed at a front end of the base to pivotally connect the support leg, and the indicating window is provided on a top surface of the pivot seat.

* * * * *